United States Patent [19]

Lawson

[11] 4,408,666
[45] Oct. 11, 1983

[54] SOD HANDLING APPARATUS

[76] Inventor: Charles L. Lawson, 612 Dundee Cir., Melbourne, Fla. 32901

[21] Appl. No.: 315,744

[22] Filed: Oct. 28, 1981

[51] Int. Cl.³ .................... A01B 45/04; A01B 75/00; A01D 90/10
[52] U.S. Cl. .......................................... 172/19; 111/1; 414/508; 414/334; 414/439; 414/564
[58] Field of Search .................. 172/19, 20; 111/1, 2, 111/3; 47/9; 414/439, 607, 508, 608, 507, 334, 564; 198/300, 310, 311

[56] References Cited

U.S. PATENT DOCUMENTS

| | | | |
|---|---|---|---|
| 684,125 | 10/1901 | Strader . | |
| 1,050,478 | 1/1913 | Lister et al. . | |
| 1,628,871 | 5/1927 | Bruce | 414/439 |
| 2,075,833 | 4/1937 | Smith . | |
| 2,243,975 | 6/1941 | Mold | 414/508 X |
| 2,347,308 | 4/1944 | Woldring et al. . | |
| 2,384,395 | 9/1945 | Payne | 414/507 X |
| 2,489,947 | 11/1949 | Backart . | |
| 2,663,242 | 12/1953 | Lancaster | 172/19 |
| 2,825,573 | 3/1958 | Shaw et al. | 414/508 X |
| 2,831,442 | 4/1958 | Montguire | 198/300 X |
| 3,020,859 | 2/1962 | Kang | 47/9 X |
| 3,059,747 | 10/1962 | Sullivan . | |
| 3,107,637 | 10/1963 | Saifuku | 198/310 X |
| 3,157,267 | 11/1964 | Asbury | 198/310 |
| 3,220,527 | 11/1965 | Curtis . | |
| 3,232,255 | 2/1966 | Mitchell | 172/552 |
| 3,338,439 | 8/1967 | Barrilleaux, Jr. et al. | 414/439 |
| 3,415,399 | 12/1968 | Nones, Jr. | 414/508 X |
| 3,792,500 | 2/1974 | Swara, Sr. . | |
| 3,877,584 | 4/1975 | Holcombe | 172/19 X |
| 3,982,711 | 9/1976 | Bradley et al. | 172/19 X |
| 4,067,393 | 1/1978 | Szarkowski | 172/19 X |
| 4,149,640 | 4/1979 | White | 111/2 X |

FOREIGN PATENT DOCUMENTS 280621  7/1966  Netherlands ............... 172/19

*Primary Examiner*—Paul E. Shapiro

[57] ABSTRACT

An apparatus for handling sod includes a wheeled frame for moving along the ground and a forward frame section which is adapted to receive pallets of sod adjacent thereto. A conveyor is coupled to the frame for transporting pieces of sod between the pallet and the ground. A pair of foot supports are attached on either side of the wheeled frame for allowing workers to stand thereon while handling the sod either along the conveyor or on the pallet. The foot supports extend forward from adjacent a rear end of the conveyor to adjacent the pallet of sod.

10 Claims, 3 Drawing Figures

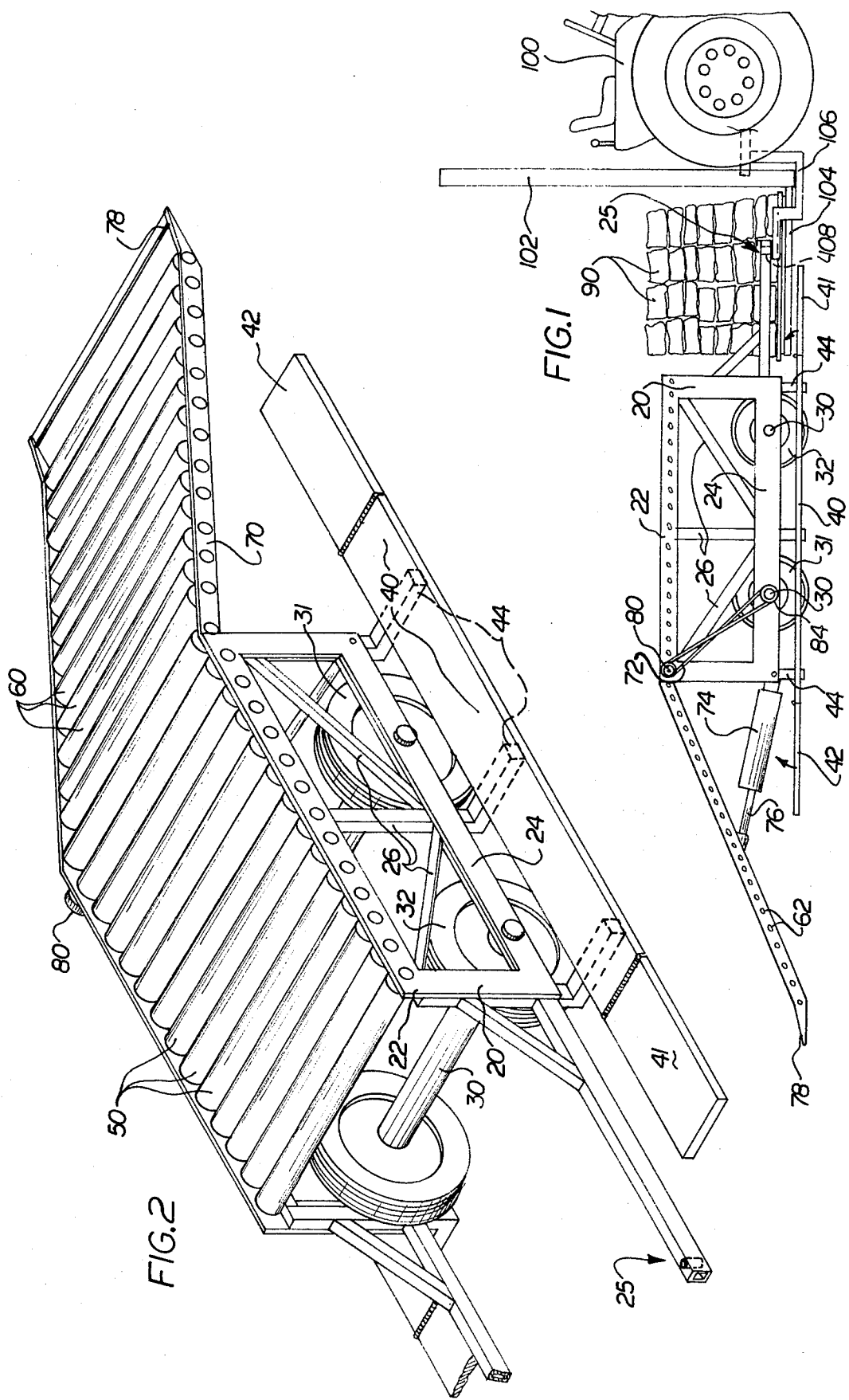

SOD HANDLING APPARATUS

BACKGROUND OF THE INVENTION

I. FIELD OF THE INVENTION

The present invention relates to an apparatus for handling sod, either in the laying of sod or the harvesting of sod, and more particularly to an apparatus which provides standing supports for workers engaged in manually handling the sod.

II. DESCRIPTION OF THE PRIOR ART

In the past, newly developed large open areas have been planted with grass seed and covered with straw in order to cover the area with growing grass. Grass has been preferable for large open areas because of its aesthethic appearance and also because of its ecological characteristics of holding ground water and preventing erosion of the soil. However, in recent years most businesses and consumers have elected to pay a slight additional charge to have sod laid on these large open areas in order to achieve immediate aesthetic and conservation benefits. The harvesting and laying of sod has become a relatively large business in view of this consumer and business demand.

At the present time a large majority of all sod is cut in rectangular strips which are then piled on top of each other and carried on pallets to the area of installation. Typically, these pieces of sod are unloaded from the pallet one piece at a time by indivicual workers. These workers must walk behind a forklift, tractor or other vehicle which carries the pallets of sod over the area to be covered. The workers must remove each individual piece of sod from the pallet and deposit it on the ground, while taking care to place the peice of sod immediately adjacent to and abutting previously laid pieces of sod. This is a back-breaking procedure which requires a great amount of energy and forces the workers to walk great distances while carying the heavy pieces of sod.

Prior inventors have attempted to solve the problem of laying and harvesting sod by mechanizing the process. These attempts have been only marginally successful, primarily because the machinery which has been developed is extremely complex and expensive to produce. Since most of the sod laying is done by small independent contractors, it is not unusual for the contractor to forego expensive capital investments and instead to rely upon expensive personal labor retained on a day-to-day basis.

White, in U.S. Pat. No. 4,149,640, discloses an apparatus for laying sod which includes a self-propelled wheeled frame having an endless loop conveyor oriented in a generally horizontal position on the top thereof. A drive mechanism is provided adjacent the rear end of the conveyor and a slide or chute is provided for receiving the pieces of sod from the conveyor drive mechanism and depositing them on the ground. White maintains the stacked orientation of the pieces of sod on the conveyor until each piece is removed sequentially by the sod driving mechanism for being deposited upon the chute. While the White disclosure does provide mechanical assistance in laying the sod, it is still imperative that workers walk beside the motorized frame in order to assist in the handling of the sod, because the flow rate of the sod pieces along the conveyor and onto the drive mechanism is not well coordinated. White furthermore teaches the concept of maintaining the stacked relationship of the pieces of sod while tipping the entire stack to the horizontal position. Although this appears to be workable in theory, in practice the sod is very difficult to handle in this manner. The sod is extremely heavy, especially when wet, and the mechanical aspects of rotating the pile of sod and moving it along the conveyor requires extraordinarily heavy construction and large amounts of energy.

The disclosure of White should be contrasted with the present invention which is designed to receive the upstanding pallets of sod adjacent to the front thereof. The present invention minimizes the manual labor required by using it only for removing the pieces of sod from the pallets and depositing the sod onto the conveyor. The sod is then transported along the conveyor in a generally rearward direction (when laying the sod). The speed of the wheeled frame is adjusted so that the sod will be deposited upon the ground without undue handling and placement. Therefore, the present invention attempts to utilize a limited amount of manual labor while maintaining the constant flow and placement of sod from the pallet onto the ground.

Strader, in U.S. Pat. No. 684,125, discloses a cart having a rear ramp employing a plurality of frictionless rollers which are used to assist in the unloading of articles carried within the cart. This device does not disclose the use of any generally horizontal conveyor, nor does it disclose the concept of placing the pallets of sod adjacent the front edge of a conveyor which is oriented suitably for allowing manual labor to remove the sod from the pallet and place the sod over the conveyor.

Curtis, in U.S. Pat. No. 3,220,527, discloses a portable roller-conveyor for handling meat or other related products. The rollers are attached to a frame to form an inclined conveyor of the size typically used for unloading products from a truck or tractor-trailer. The frame includes several wheels for allowing the apparatus to be moved between operating locations. While Curtis does disclose an inclined conveyor comprising a plurality of rollers, there is absolutely no teaching that these rollers may be used for depositing the sod upon the ground nor is there any teaching relating to juxtaposing the pallet of sod adjacent to both the front end of the conveyor rollers and foot supports for the manual laborers.

Various other conveyors are disclosed by Swara in U.S. Pat. No. 3,792,500; Woldring in U.S. Pat. No. 2,347,308; Backart in U.S. Pat. No. 2,489,947; Sullivan in U.S. Pat. No. 3,059,747; Smith in U.S. Pat. No. 2,075,833; and Lister in U.S. Pat. No. 1,050,478. These references are generally related to the movement of articles along conveyors, and they contain teachings as to the use of foot supports for manual laborers involved in the loading or unloading of the articles to be moved along the conveyor.

SUMMARY OF THE INVENTION

The present invention relates to an apparatus for handling sod. The apparatus includes a wheeled frame for moving along the ground. The frame includes a front end which is adapted to receive pallets of sod adjacent thereto. A conveyor is coupled to the frame for transporting pieces of sod between the pallet of sod and the ground. Manual laborers are supported on either side of the conveyor by foot supports which extend forward from adjacent a rear end of the conveyor to adjacent the pallet of sod.

BRIEF DESCRIPTION OF THE DRAWINGS

Other objects, features and advantages of the present invention will be apparent from a study of the written description and the drawings in which:

FIG. 1 illustrates a side elevation of a first preferred embodiment of the sod handling apparatus in accordance with the present invention.

FIG. 2 is a top perspective view of the first preferred embodiment of the sod handling apparatus.

Figure 3:
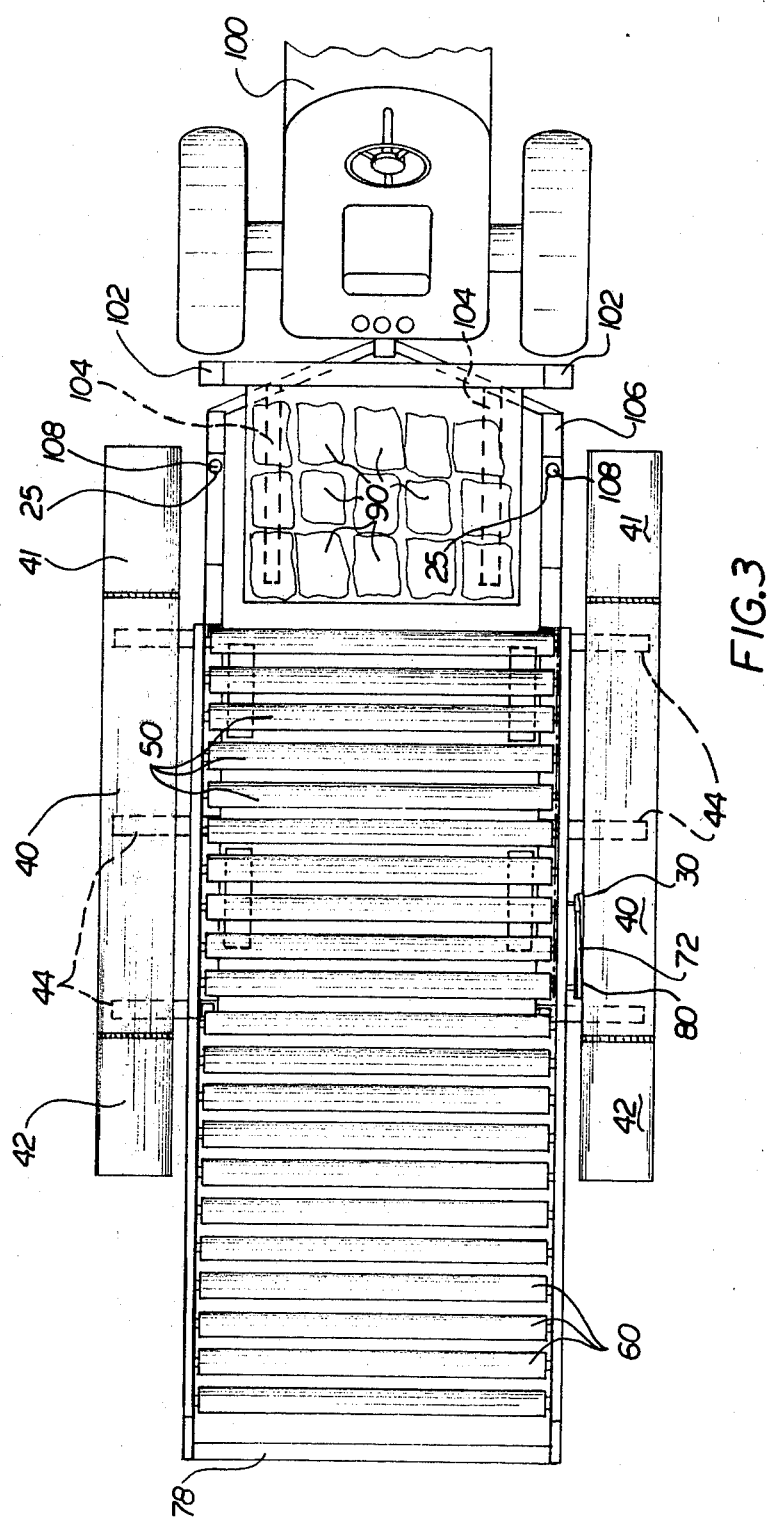
FIG. 3 is a top elevation of the sod handling apparatus which is coupled to a tractor or forklift vehicle.

In the drawings, like reference characters will refer to like parts throughout the several views of each of the embodiments of the invention. However, variations and modifications may be effected without departing from the spirit and scope of the concept of the disclosure, as defined by the appended Claims. It should also be observed that the elements and operation of the present invention have been illustrated in somewhat simplified form in each of the drawings and in the following specification in order to eliminate unnecessary and complicating details which would be apparent to one skilled in this art. Therefore, other specific forms and constructions of the invention will be equivalent to the embodiment described although departing somewhat from the exact appearance of the drawings.

DESCRIPTION OF THE PREFERRED EMBODIMENT

The first preferred embodiment of the sod handling device in accordance with the present invention is illustrated generally in FIGS. 1 and 3 as being coupled to a tractor 100 of the type employing a lift 102, a lifting fork 104 and a towing fork 106. It will be apparent to one skilled in this art that the lifting fork 104 may be elevated by the lift 102 in order to raise or lower weights, such as pallets of sod, to the appropriate height. As illustrated in FIGS. 1 and 3, the towing fork 106 includes at each distended end thereof an upstanding towing pin 108 for coupling with the device to be towed.

The sod handling device comprises a generally rectangular main frame 20 which includes an upper horizontal section 22 and a lower horizontal section 24. The integrity of the frame 22 is maintained by a plurality of bracing elements 26. The lower frame section 24 is extended in a forward direction and includes adjacent the distended ends thereof towing pin receptacles 25 which are sized for receiving the towing pins 108 attached to the towing fork 106. In this manner the towing fork 106 may be elevated by hydraulic or pneumatic means so that the forklift tractor 100 may be quickly and easily coupled to or detached from the sod handling device.

The left and right sections of the lower frame 24 of the sod handling device support two generally parallel axels 30 coupled therebetween. These axels 30 support first wheels 31 and second wheels 32 which are of sufficient size to allow the device to be towed over relatively soft ground while not appreciably being slowed or restrained by indentations in the supporting earthen surface. While FIG. 1 illustrates the wheels 31 and 32 as being located generally within the bounds of the rectangular frame 20, it will be apparent that prudent design may require that the wheels 31 and 32 be displaced in order to carefully manage the center of gravity of the sod handling device and the sod which is being used in conjunction therewith.

The left and right sides of the main frame 20 each include a running board, illustrated generally as 40. The width of the running board 40 is generally determined such that persons manually processing the sod may stand on the running board 40 so as to have easy access to the upper elements of the sod handling device. The length of each of the running boards 40 is determined such that a single person may move completely to the front or to the rear of the frame 20, or in the alternative several workers may be simultaneously supported by each of the runners as required. A first end 41 of the running board is pivotally coupled to the main section of the running board for being folded into a storage or non-extended position. In a similar manner a second end 42 of each of the running boards is pivotally coupled to the main section of the running board 40 for being folded into a storage position.

A plurality of generally cylindrical rollers are movably coupled between the left and right sides of the upper section 22 of the main rectangular frame 20. Each of these rollers 50 rotates around roller axels 52 which are coupled through and secured to the upper section 22 of the main frame 20. The rollers 50 are oriented so that a piece of sod which is placed on the rollers may be moved either toward the front or toward the rear of the device. It is presently envisioned that the rollers 50 may be operatively coupled through a main gear or chain type drivetrain which would allow each of the rollers to be independently rotated in the proper direction in order to transfer a piece of sod either in the forward or rearward direction.

While a plurality of rollers 50 are illustrated in FIGS. 1 and 3, it may be desirable to utilize a flexible conveyor belt for moving the sod therealong. The use of the conveyor belt could substantially simplify the drive mechanism in that only the end rollers would be driven in order to move the entire conveyor belt. The inclusion of the additional rollers 50 beneath the upper surface of the conveyor belt would be desirable in order to support the weight of the pieces of sod being transferred therealong. In any event, it would be highly desirable to utilize rollers 50 which have a low rolling resistance. While the upper section 22 of the frame 20 is illustrated as being generally parallel to the ground surface, it may also be desirable to incline this portion of the frame 22, and the rollers 50 coupled thereto, either in the forward or rearward direction depending upon whether the device is used for harvesting sod or laying sod.

An inclined frame section 70 is coupled by a pivot 72 at one end thereof to the main frame 20. This movable coupling is desirable in order to allow the inclined frame 70 to be elevated into a convenient position for handling or laying sod. A distended end 78 of the inclined frame 70 is provided with a relatively sharp leading edge in order to dislodge the roots of the grass or sod from the adjacent earthen surface when the sod handling device is used for harvesting. The distended end 78 of the inclined frame 70 may be elevated slightly above the ground surface when the sod handling device is being utilized for laying the sod.

As illustrated in FIGS. 1 and 3, a plurality of inclined rollers 60 are rotatable about axels 62 which communicate between the left and right sections of the inclined frame 70. The inclined rollers 60 are arranged in a manner similar to the rollers 50 in the upper section 22 of the frame 20, and are generally a continuation thereof. In this manner, when a piece of sod is depostied on the main rollers 50, it may be moved in a rearward direction so as to be deposited upon the inclined rollers 60. Gravitational forces will then draw the piece of sod down the inclined rollers 60 to a point adjacent to the distended end 78. If a plurality of pieces of sod are each sequentially placed along the inclined frame 70, the piece of sod immediately adjacent the distended end 78 will come into contact with the ground surface, and through resistive coupling it will be drawn off of the inclined frame 70 and the inclined rollers 60. Gravitational forces will then cause a queuing of each of the consecutive pieces of sod so that each will be drawn downwardly for being deposited on the ground immediately adjacent to the previously laid piece of sod. When the sod handling device is used for harvesting sod, the reverse steps of this process are followed. As each piece of sod is cut, the cutting edge 78 will be wedged beneath the piece of sod and will force it to move upwardly along the inclined rollers 60 and the inclined frame 70 until it is deposited upon the main rollers 50.

The elevation of the inclined frame 70 may be adjusted by varying the hydraulic (or pneumatic pressure) to a hydraulic actuator 74 which includes an extendable actuator arm 76 movably coupled thereto. It may be desirable to substitute a mechanical screw or other similar mechanical device in place of the hydraulic actuator 74 and actuator arm 76 when simplicity of maintenance and design are favored over the mechanical advantage gained by the use of hydraulics or pneumatics.

In order to eliminate the requirement for an additional power source in the first preferred embodiment of the present invention, the power for driving the main rollers 50 (and any conveyor belt paired therewith) is provided through a chain 82 which is coupled between a driving sprocket 84 which is coupled to the axel 30 of the first wheel 31, and a driven sprocket 80 which is coupled to the axel 52 of the rearmost roller 50. The circumferential ratios of the driven sprocket 80 and the driving sprocket 84 are determined such that the main driving roller 50 and the other rollers (or conveyor belts) controlled thereby will force the pieces of sod downwardly along the inclined rollers 60 at a speed generally equal to or slightly greater than the forward speed of the sod handling device as it moves over the ground surface. It will be apparent that the directions of rotation of the driven sprocket 80 and the driving sprockets 84 may be reversed when the sod handling device is used in the harvesting process.

With reference to FIG. 3, the left and right forward sections of the lower frame 24 are spaced from each other in order to define a space therebetween sufficient in size for receiving a typical pallet on which pieces of sod may be stored. When the sod handling device is being used to lay the pieces of sod, the sod will already be deposited upon the pallet and will be removed by hand by the operators standing upon the running boards 40 in order to be deposited upon the rollers 50 (or the conveyor belt coupled thereto). On the other hand, if the sod handling device is being used for harvesting the sod, then the handlers will remove the sod from the rollers 50 and deposit it on the pallet supported by the lifting fork 104 of the forklift tractor 100.

The use of a plurality of independent inclined rollers 60 on the inclined frame 70 is important in that gravitational forces are used both in the harvesting and in the laying processes for causing adjacent consecutive pieces of sod to maintain close contact with each other.

During the process of laying the sod, adjacent consecutive pieces of sod will be pulled by gravitational forces into close communication with each other. When the sod handling device is being used for harvesting the sod, gravitational forces, together with the pushing effect of the distended cutting edge 78 of the inclined frame 70, will force the consecutive pieces of sod upwardly along the inclined rollers 60 and then onto the main rollers 50. The location of running boards 40 is somewhat critical in that the width and elevation of the running boards must be suitable for locating the workers immediately adjacent to the upper main rollers 50.

It may also be desirable to provide several reinforcing frame elements which communicate between the inclined frame 70 and the main frame 22 in order to maintain the angular relationship of the inclined frame 70 with respect to the ground surface when the sod handling deivce is being propelled against the resistance of the sod.

It will be apparent that in the sod laying process the height of the lifting fork 104 may be periodically regulated in order to elevate the remaining pieces of sod upwardly to a convenient working level for the workers standing on the running boards 40. In a like manner, the lifting fork 104 may be lowered to a convenient height when the workers are harvesting the sod.

In accordance with the provisions of the United States Patent Laws, a preferred embodiment of the present invention has been described in some detail. The principles of the present invention have been described in the best mode in which it is now contemplated that such principles will be applied. However, it should be understood that the constructions shown and described in the attached specification and drawings are merely illustrative and that the invention is not limited thereto. Accordingly, alterations and modifications which readily suggest themselves to persons skilled in this art, without departing from the true spirit of the disclosure herein, are intended to be included in the scope of the following Claims.

I claim:

1. An apparatus for handling sod, comprising in combination: a frame having wheels for moving along the ground, said frame having a front end adapted to receive a pallet of sod adjacent thereto;
    conveyor means coupled with said frame for transporting pieces of sod between the pallet of sod and the ground; and
    a pair of foot supports attached on either side of said frame for allowing workers handling the sod to move therealong, with said foot supports extending forward from adjacent a rear end of said conveyor means, past said front end of said frame to adjacent the pallet of sod.

2. The sod handling apparatus as described in claim 1 wherein said conveyor means includes a generally horizontal section adjacent the pallet of sod and an inclined section extending from said horizontal section to a lower level, generally adjacent to the ground.

3. The sod handling apparatus as described in claim 2 further including means for varying the angle of said inclined section with respect to said horizontal section of said conveyor means.

4. The sod handling apparatus as described in claim 3 wherein a distended end of said inclined section of said conveyor means includes means for cutting sod as it is moed onto said inclined section during the harvesting process.

5. The sod handling apparatus as described in claim 2 wherein said conveyor means comprises a plurality of generally cylindrical rollers movably coupled to said frame.

6. The sod handling apparatus as described in claim 5 wherein said horizontal section of said conveyor means comprises a generally endless loop conveyor.

7. The sod handling apparatus as described in claim 5 wherein the pallet of sod is independently supported by a rear section of a motorized vehicle, and wherein said foot supports include sections extending forward so as to bracket the pallet on either side thereof.

8. The sod handling apparatus as described in claim 7 wherein said extending sections of said foot supports are coupled to said frame for folding away from the pallet of sod.

9. The sod handling apparatus as described in claim 7 wherein said frame includes two forwardly projecting elements having apertures therein for removably coupling with a towing fork of the motorized vehicle.

10. The sod handling apparatus as described in claim 5 further including means operatively coupled between said wheels and said conveyor means for moving the sod along said conveyor means responsive to the rotation to said wheels.

* * * * *